US 8,744,879 B2

(12) United States Patent
Bodansky et al.

(10) Patent No.: US 8,744,879 B2
(45) Date of Patent: Jun. 3, 2014

(54) SYSTEM AND METHOD FOR INSURANCE PRODUCT DEVELOPMENT

(76) Inventors: Victor Bodansky, Brooklyn, NY (US); Vlad Aronov, Staten Island, NY (US)

( * ) Notice: Subject to any disclaimer, the term of this patent is extended or adjusted under 35 U.S.C. 154(b) by 954 days.

(21) Appl. No.: 12/463,147

(22) Filed: May 8, 2009

(65) Prior Publication Data

US 2010/0042444 A1    Feb. 18, 2010

Related U.S. Application Data

(60) Provisional application No. 61/088,144, filed on Aug. 12, 2008.

(51) Int. Cl.
*G06Q 40/00* (2012.01)
(52) U.S. Cl.
USPC .............................................................. 705/4
(58) Field of Classification Search
USPC ............................................... 705/4, 35
See application file for complete search history.

(56) References Cited

U.S. PATENT DOCUMENTS

| | | | |
|---|---|---|---|
| 5,523,942 A * | 6/1996 | Tyler et al. | 705/4 |
| 7,664,670 B1 * | 2/2010 | Weiss | 705/7.32 |
| 8,224,672 B1 * | 7/2012 | Griffith | 705/4 |
| 2003/0101132 A1 * | 5/2003 | Gaubatz et al. | 705/38 |
| 2005/0027572 A1 * | 2/2005 | Goshert | 705/4 |
| 2006/0100912 A1 | 5/2006 | Kumar et al. | |
| 2008/0052135 A1 * | 2/2008 | Ziade et al. | 705/4 |
| 2008/0120129 A1 | 5/2008 | Seubert et al. | |
| 2008/0183508 A1 | 7/2008 | Harker et al. | |
| 2009/0012840 A1 * | 1/2009 | Gaubatz et al. | 705/10 |
| 2009/0177498 A1 * | 7/2009 | Gaubatz et al. | 705/4 |
| 2010/0023355 A1 * | 1/2010 | Sagalow et al. | 705/4 |
| 2013/0110556 A1 * | 5/2013 | Griffith | 705/4 |

OTHER PUBLICATIONS

Mehr, R. I. (1968). Some Thoughts on Product Development in Life Insurance. Journal of Risk and Insurance (Pre-1986), 35(4), 553.*
Dorfman, M. S. (1971). The Product Performance of the Life Insurance Industry: Revisited. Journal of Risk and Insurance (Pre-1986), 38(4), 613.*
PCT Search Report.

* cited by examiner

*Primary Examiner* — Hani M Kazimi
(74) *Attorney, Agent, or Firm* — Meister Seelig & Fein LLP

(57) ABSTRACT

Described are systems and methods for insurance product development. A method may include generating a product specification for an insurance product, compiling the product specification into a product model, inputting test data into the product model to generate output data, and comparing the output data to at least one predetermined benchmark. The product specification may include computer code.

21 Claims, 9 Drawing Sheets

```
AUL3 - Microsoft Visual Studio - [PROPOSAL]
BUSINESS  VARIABLE  ▼  PRODUCT  ▼  AUL3  ▼  TESTBED ▼  aaa  ▼  POLICY ▼  a2  ▼
INTERFACE    PROPOSAL    REPORTS    DOCUMENTATION
File ▼  Edit ▼  Run ▼  Insert ▼  Code Control ▼

AUL3 Version: 98  Released by Saravanan Sabapathy on 05/18/2007 4 : 12 : 19 PM
"/
FUNCTION GENERAL_ORDER_OF_PROCESSING ()
{
    for (p = 1; p <= MAX_PROJECTIONS; P++)
    {
        for (i = 1; i < LAPYR [p]; i++)
        {
            for (j = 1; j < 12; j++)
            {
                BEGIN_MONTHLY_PROCESSING ();
            }
        }
    }
}

FUNCTION INITIALIZE_PROJECTION()
{
    ZERO_OUT_VALUES_FOR_PROJECTION ()
    if (p is 1)
    {
        INITIALIZE_VALUES_DO_NOT_VARY_BY_PROJECTIONS ();
        PROJECTION_MORTALITY_CHARGE = CURRENT;
        PROJECTION_INTEREST_ASSUMPTION = REQUESTED_INTEREST_ASSUMPTION;
        iUSER = CURRIATE = REQUESTED_ILLUSTRATION_RATES [1];
    }
    if (p is 2)
    {
        PROJECTION_MORTALITY_CHARGE = MID_POINT;
        PROJECTION_INTEREST_ASSUMPTION = REQUESTED_INTEREST_ASSUMPTION;
        iUSER = 0.5    * REQUESTED_ILLUSTRATION_RATES [1];
    }

ACCUMULATE_UNNECESSARY_PREMIUMS  ▼

Ready                                                        Ln5   Col 41   Ch40   INS
```

SYSTEM AND METHOD FOR INSURANCE PRODUCT DEVELOPMENT

PRIORITY CLAIM

The present application claims priority to U.S. Provisional Patent Application No. 61/088,144, entitled "SYSTEM AND METHOD FOR INSURANCE PRODUCT DEVELOPMENT," filed on Aug. 12, 2008, the disclosure of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to systems and methods for developing insurance products. More specifically, the present invention relates to systems and methods for generating computer code from a product specification created by an actuary.

BACKGROUND OF THE INVENTION

A conventional product development cycle begins when an actuary conceives of an insurance product, including terms, features, benefits, riders, etc. associated with the product. The actuary drafts a specification outlining the features of the product and provides the specification to a computer programmer, who creates a product model. The programmer creates the product model based on the content of the specification, and the product model simulates effects of the product (based on the features) in different scenarios (e.g., purchase by clients of different age, medical history, gender, race, employment status, etc.). A quality assurance engineer executes the product model on the scenarios to determine whether the product will behave as expected. If the product model does not produce an expected output, the product model is returned to the computer programmer for troubleshooting, and/or back to the actuary for revision of the product specification.

The conventional product development cycle requires significant company resources in terms of time and cost. For example, the actuary, after completing the specification, may have to consult with the computer programmer regarding the development of the product model and the quality assurance engineer regarding the output of the product model. The computer programmer may be required to, based on the output reviewed by the quality assurance engineer, create several versions of the product model, which then must be tested by the quality assurance engineer. Any changes an actuary may want to make to the model, either in the current product or in designing future products, would require re-programming of the product model.

The present invention provides improved methods and systems for streamlining the insurance product development process by reducing or eliminating the need to independently develop computer program code.

SUMMARY OF THE INVENTION

The present invention relates to systems and method for insurance product development. An exemplary method may comprise generating a product specification (e.g., computer code) for an insurance product, compiling the product specification into a product model, providing test data to the product model to generate output data, and comparing the output data to at least one predetermined benchmark.

The exemplary method may further include generating a report based on the comparison of the output data and the at least one predetermined benchmark, and generating product documentation as a function of at least one of the product specification, the output data and the report. Data may be received in fields in a graphical user interface, and the computer code of the product specification may be generated as a function of the data and the fields. Access to at least one of the product specification and the product model may be restricted. A previous product specification for a previous insurance product may be selected as a function of at least one feature of the intended insurance product. The test data may be selected from a database of previous test data. The product specification may be input directly to a compiler, and the computer code in the product specification may be limited to at least one of predefined statements, predefined variables and predefined functions.

An exemplary embodiment of an apparatus may comprise an interface module displaying a user interface on a computing device, a specification drafting module generating a product specification for an insurance product, and a reporting module generating a report based on a comparison of output data from a simulated operation of the insurance product and a predetermined benchmark.

The exemplary apparatus may include a documentation module generating documentation for the insurance product based on at least one of the product specification, the report, the output data, and the comparison of the output data to the predetermined benchmark. The exemplary apparatus may include a compiler module compiling the product specification into a product model, a testing module providing input data to the product model to generate the output data, and an authorization module restricting access to at least one of the product specification and the report.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 shows a screenshot of a user interface for generating a product specification according to an embodiment of the present invention;

FIG. 4 shows a screenshot of a user interface for viewing and/or editing a product specification according to an embodiment of the present invention;

FIG. 5 shows a screenshot of user interfaces for editing a product specification according to an embodiment of the present invention;

FIG. 7 shows a screenshot of user interfaces for editing a product specification according to an embodiment of the present invention;

FIG. 8 shows a screenshot of a user interface for creating and/or selecting a simulation according to an embodiment of the present invention; and FIG. 9 shows a screenshot of a user interface for generating product documentation for a given product according to an embodiment of the present invention.

DETAILED DESCRIPTION OF THE INVENTION

The present invention relates to systems and methods for developing insurance products including, but not limited to, annuities, life insurance, pensions, mortgage and credit insurance, short and long term disability, employer-sponsored savings plans, medical, dental, health savings accounts and long term care insurance, auto insurance, homeowners insurance, commercial property insurance, workers' compensation programs, title insurance, malpractice insurance, products liability insurance, directors and officers liability insurance, environmental and marine insurance, terrorism insurance and other types of liability insurance.

Figure 1:
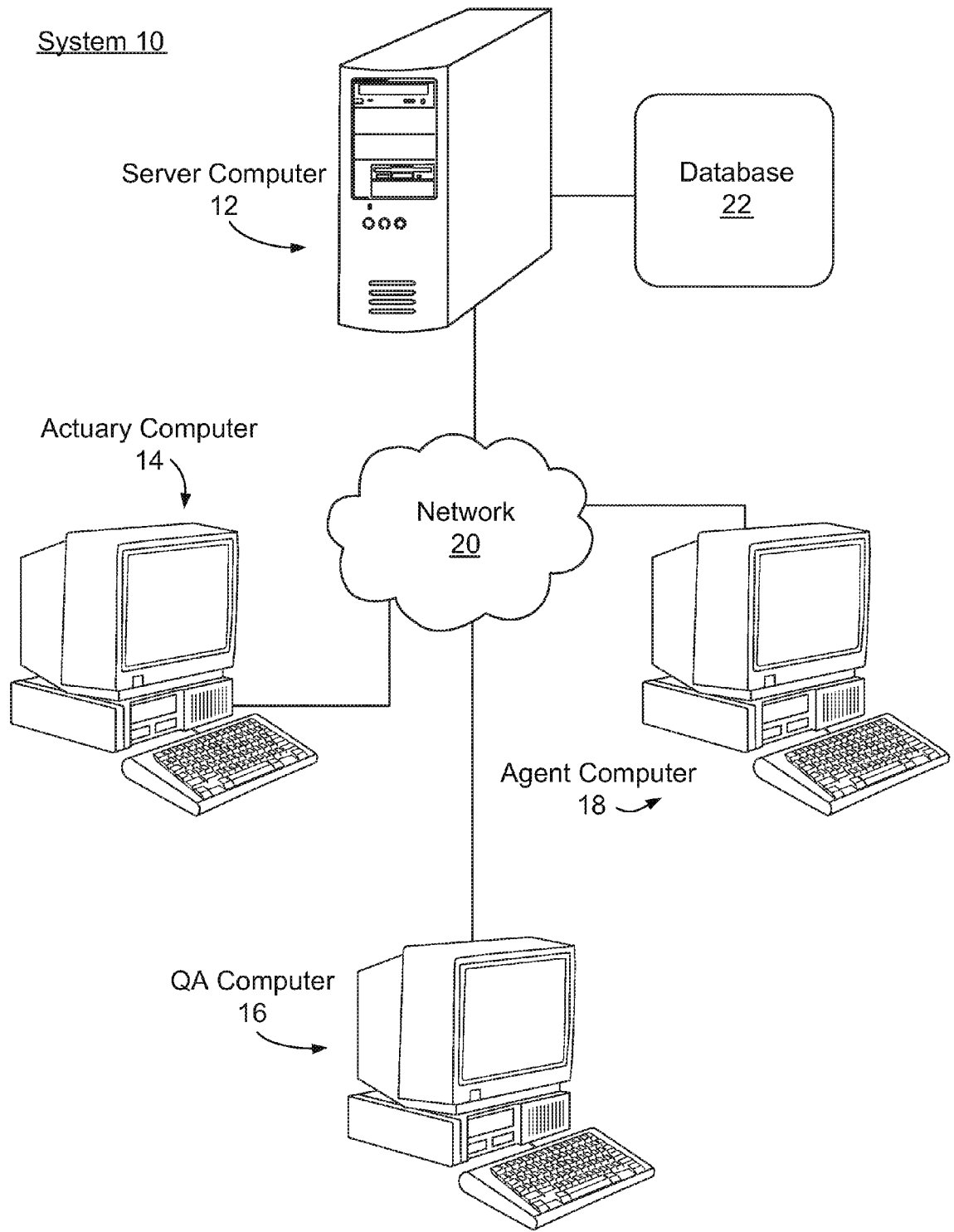
FIG. 1 shows a system for insurance product development according to one embodiment of the present invention.

As shown in FIG. 1, a system 10 according to an exemplary embodiment of the present invention may include a server computer 12, an actuary computer 14, a QA computer 16 and an agent computer 18 communicatively interconnected through a communications network 20. As understood by those of skill in the art, computers 12-18 can be any processor-based computing devices which include memory, input/output devices and/or displays. The network 20 may be, for example, a wired and/or wireless LAN or WAN, the PSTN, the Internet, an intranet, etc. Computers 14-18 may access files hosted on the server computer 12 or other computers connected to the network 20 using a network interface (e.g., a browser, a command line interface, etc.). The server computer 12 may include and/or be coupled to one or more databases 22 which stores data and files. Those of skill in the art will understand that there may be any number of server computers, user computers, databases and/or networks in the system 10.

In an exemplary embodiment, the network 20 may be an intranet and the server computer 12 and computers 14-18 may be utilized by individuals working for a single company, e.g., an insurance company. For example, an actuary may use the Actuary computer 14, a quality assurance engineer/analyst may use the QA computer 16 and an agent/broker/sales person may use the Agent computer 18. In this embodiment, therefore, the system 10 may be entirely self-contained within a single business entity. Files, data and programs used by the computers 12-18 may only be accessed by authorized users. As understood by those of skill in the art, one or more components of the system 10 may be physically located in locations different from other components of the system 10, or all of the components may be located at the same physical location.

In an exemplary embodiment, the Actuary computer 14 may include a computer program which allows an actuary to develop an insurance product. The computer program may include an interface module (e.g., a graphical user interface, a command line interface, etc.), a specification drafting module, a reporting module and/or a documentation module. Those of skill in the art will understand that the computer program or any one or more of its modules may reside on the computers 14-18 and/or the server computer 12. In another exemplary embodiment, access to one or more of the modules may be limited based on a job function being performed. For example, as explained further below, the agent may not be given access to the specification drafting module, because only actuaries may be authorized to use that module.

Using the computer program, an actuary may create a product specification for a new insurance product. In an exemplary embodiment, the actuary may create the product specification by, for example, entering data in fields presented by the interface module, and the specification drafting module may generate computer code based on the entered data. Alternatively, or in addition to use of the interface module, the actuary may manually write the computer code and/or revise the computer code generated by the specification drafting module for the product specification. In any embodiment, the computer code is written in a predetermined computer language (e.g., Actuarial Specification Language, or "ASL"). The computer language has predetermined rules, constructs, statements, etc. which are accepted and which allow the product specification to be directly compiled by a compiler. For example, in one embodiment, the rules of the computer language may be:

ASL Syntax

There may be two basic types of variables: MONEY, and INTEGER.

There may be three basic programming statements (if, if-else, for)—examples:

```
A.  if (i is 1)
    {
        ADMCHG = 10;
    }
B.  if (i is 1)
    {
        ADMCHG = 10;
    }
    else if (i > 1 and i <= 10)
    {
        ADMCHG = 15;
    }
    else
    {
        ADMCHG = 0;
    }
C.  for (year = 1; year <= 120; year++)
    {
        total = total + 1;
    }
```

Each statement is ended with a semicolon—example:

$FA = \min(FA, DW-AW)$;

Parenthesis enclose conditions and indicate priority—example:

$X = (A+B)*(C+D)$;

Curly brackets enclose statement body; square brackets indicate arrays—example:

LNBL [i][j].

After the product specification is written (e.g., by the actuary and/or by the specification drafting module), the product specification may be compiled. That is, in the exemplary embodiment, the computer code written by the actuary and/or output by the specification drafting module may be entered directly into a compiler (e.g., a compiler program and/or compiler module of the computer program) to create an executable program, or product model. The product specification is written in compilable format, e.g., is written according to the syntax required by the compiler for compilable statements recognized by the compiler. This avoids the need for a programmer to receive the product specification and draft computer code based on it. A debugger may be utilized in parallel or series with the compiler. The debugger may also be utilized when the product specification is created, e.g., as a real-time check system to ensure that the proper commands and syntax are being used.

The product model may be used to simulate the product and how it will function in various scenarios. In an exemplary embodiment, the actuary and/or the quality assurance analyst may perform selected simulations and create output data using the reporting module (which may include a testing module) of the computer program. The selected simulations may be chosen on a per-simulation basis (e.g., after simulation_1 is complete, simulation_2 is selected from a list of potential simulations) or grouped and run automatically (e.g., simulation_1-4 are executed). An exemplary simulation can be generated by entering test data/parameters (e.g., age, lifespan, medical history, gender, race, income, employment status, dependents, etc.) into fields and instructing the product model to use the test data. A duration of the simulation can be a predefined time period (e.g., an expected life of the product, an expected life of a product purchaser, etc.). If the product is an annuity, for example, the predefined time period may begin at a time when the annuity is issued and operate for a lifespan of an annuitant. The reporting module may generate the output data (e.g., reports, graphs, recommendations, errors, red flags, etc.) reflecting operation of the product model based on the test data provided. The output data may include, but is not limited to, disclosure and sales ledgers, monthly calculation summaries, and additional production and QA reports. The computer program may also compare the output data of the product model to predetermined benchmarks, which may be preprogrammed (e.g., based on the actuary's expectations), based on previous products' (actual or modeled) performances, industry standards, statutory, legal, administrative and/or regulatory requirements, etc.

The reporting module may also generate reports that detail operation of the product model as it is being tested. The product model may utilize variables, parameters, etc. which generate intermediary data based on the test data (and subsequently calculated values) to produce ultimately the output data of the product model. If, for example, the product model does not provide expected output data, the actuary or quality assurance analyst may wish to review the intermediary data to ensure that the product model operates as expected. In an exemplary embodiment, the product specification may include computer code which generates (and/or extracts/displays) the intermediary data at various times during operation of the product model. The reports providing the intermediary data may be provided during the simulation and/or after the simulation is complete.

Based on the reports provided by the reporting module, the actuary may make changes to the product specification, which may then be re-compiled and re-tested. In an exemplary embodiment, the actuary can make changes directly to the product specification to create a new product specification and the new product specification can be entered directly into the compiler. The reporting module may suggest changes to the product specification in order to achieve the expected output data. When the product specification is in final form (e.g., ready to be offered to the public as a product), the documentation module may be utilized to generate a product description (e.g., table of contents, function descriptions, brochure, government filing, etc.) for the product based on the product specification, the testing results, manually entered notes, pricing schemes, etc. In an exemplary embodiment, the documentation module may parse the product specification to create the product description. For example, the documentation module may convert a computer code construct in the product specification into a prose description for the product description. An agent may offer the product for sale to customers by entering customer-specific data (e.g., age, weight, medical condition, race, gender, employment status, expected return, risk aversion, etc.) into the Agent computer 18 and generating a customer-specific price. The customer-specific data may further include any options, riders or other customizations selected by the customer and/or the agent based on, e.g., discussions with the customer and/or internal pricing strategies.

In another exemplary embodiment of the present invention, the actuary may utilize an existing product specification for an existing product to develop a new product specification for a new product. In this manner, the actuary may retrieve the existing product specification from the server computer 12 and/or database, because it has one or more features that resemble anticipated features of the new product. For example, the actuary may identify features (or expectations) for the new product and a matching algorithm (e.g., fuzzy logic, database lookup, etc.) may select the existing product (s) which include the same or closely-related features (or results). The actuary can configure the new product specification by making changes to the existing product specification, significantly decreasing development time. The new product specification can be compiled and executed using test data associated with the existing product (e.g., stored in the database) or any prior product, or new test data. The output data of a new product model may be compared to predetermined benchmarks associated with existing product or any prior product, or new benchmarks.

In a further exemplary embodiment, a level of access to forms of the product may be restricted based on employee job function (e.g., by using an authorization module of the computer program). For example, to access a product specification, an employee may be required to enter an access code (e.g., PIN, biometric, card swipe, etc.) or use a specified computer terminal at a particular location (e.g., within the company, access to the intranet, etc.). That is, only actuaries may be granted access to the product specifications and have full read-write-edit permissions. Thus, the actuaries may be the only persons authorized to create and/or make changes to the product specification. The quality assurance analyst may be granted read permission to the product specification and access to the compiled version of the product specification to, for example, allow for testing and analysis. The agent may only be granted permission to use the final product for pricing and/or creating product literature.

In another exemplary embodiment, access to the product may further be controlled by a token system. For example, the actuary creating the product specification may logically maintain a token (e.g., computer code or program that prevents other users from access code, files or data) and, accordingly, be the only entity with access to the product at a particular time. Another actuary (or programmer) may not access and/or the quality assurance analyst may not view the product specification until the actuary releases the token. That is, the token may travel with the product through its development cycle. In an exemplary embodiment, one user (or a predetermined number of users) may be authorized to use, view and/or manipulate the product specification, the product model, the product, the product literature, the test data, etc. Additionally, the system may record times for which the product is being used and the entities using the product, any changes made, any tests performed and/or output data generated, any pricing schemes created, etc.

In another exemplary embodiment, the product may be hosted on a collaboration system. For example, the actuary who created the product specification may provide selective access thereto. The actuary may be presented with a list of individuals and select those individuals who should be granted access to the product specification and the permissions (e.g., read, write, edit, compile, test, etc.) granted to each. The actuary may also limit the times for which the selected individuals may access the product specification. For example, the actuary may indicate that the selected individuals may only access the product specification when the actuary is on-line (e.g., so as to answer questions, make changes, explain functionality, etc.) or when the actuary is off-line or no longer using the product specification (e.g., so the product specification can be compiled and tested).

Figure 2:
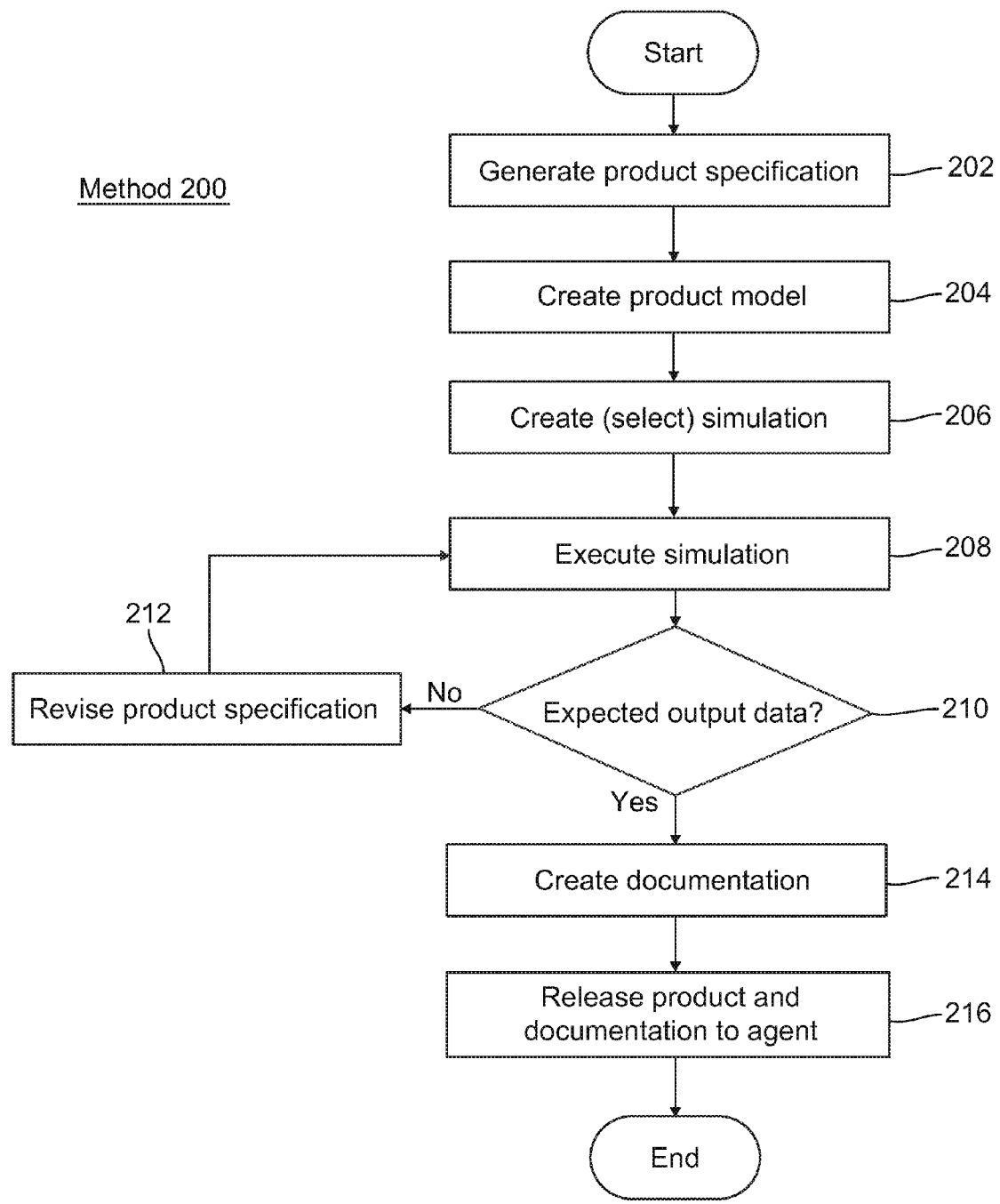
FIG. 2 shows a method for insurance product development according to an embodiment of the present invention.

FIG. 2 shows an exemplary embodiment of a method 200 for insurance product development according to the present invention. Those of skill in the art will understand that the steps of the method 200 may be executed on any combination of hardware and/or software in a distributed and/or isolated architecture. For example, in one exemplary embodiment, the steps of the method 200 may be executed by one or more software programs, routines, libraries, etc. on a single computer or multiple non-networked computers. In another exemplary embodiment, the steps of the method 200 may be carried out in a distributed computing environment, and any of the steps may be executed by one or more software programs, routines, libraries, etc. on servers and/or personal computing devices, which communicate over a network.

In step 202, a product specification is generated. The product specification may be based on terms, features, costs, fees, benefits, riders, etc. associated with a desired insurance product. The product specification may be, for example, an electronic file containing computer code. In an exemplary embodiment, an actuary (or any other user) may write the computer code and/or may use a computer code generator of a specification drafting module of a computer program. In another exemplary embodiment, the product specification may be based on a previous product specification selected from a database. For example, the actuary may select the previous product specification from the database, or a software program (e.g., a matching algorithm) may identify terms, features, etc. of the intended product and select the previous product specification(s) associated with previous products which most closely resemble the intended product. The software program may also identify portions of the previous product specification which may be changed to comport with the terms, features, etc. of the intended product, thereby allowing the actuary to make focused changes (decreasing development time).

Figure 3:
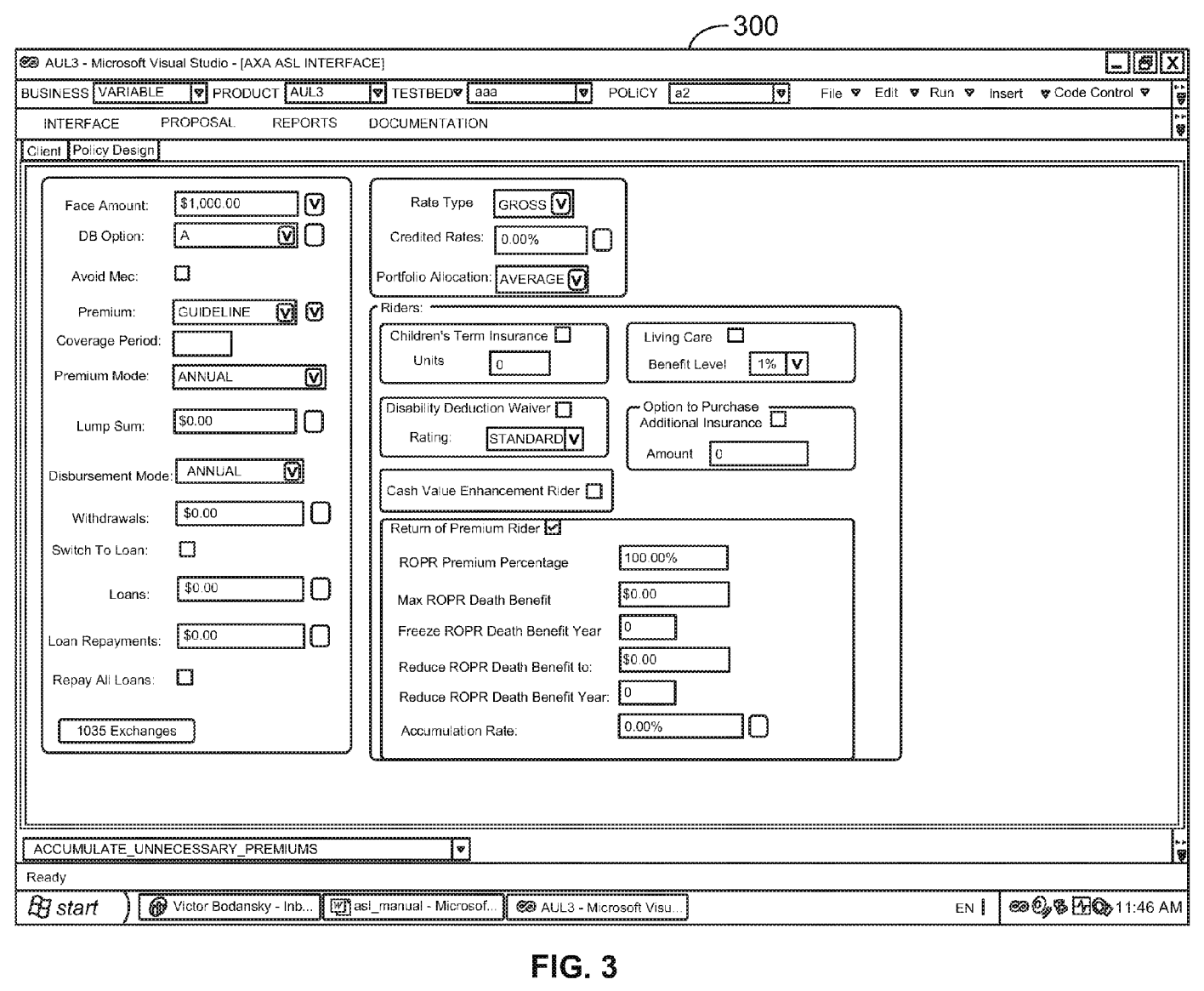

FIG. 3 shows an exemplary embodiment of a screenshot of a user interface 300 for generating a product specification according to the present invention. The user interface 300 may provide one or more toolbars, drop-down menus, form fields, etc. which the actuary may use to configure terms, features, etc. for an insurance product. For example, the actuary may enter data related to a policy face amount, a premium type/amount, a coverage period, a premium mode, a lump sum amount, a disbursement mode, a withdrawal amount, a loan amount, a loan repayment amount, a rate type, a credited rate, a portfolio allocation indicator, and any applicable riders. As understood by those of skill in the art, any other field or data entry option may be used by the user interface 300, and, in an exemplary embodiment, selecting an option (or entering data) in a given menu/field may reconfigure (e.g., activate, gray-out, switch options, automatically populate with data) other menus/fields.

The user interface 300 may be one interface of a program which can be used throughout the process of creating and testing an insurance product. For example, the user interface 300 may include a viewer toolbar with several options (e.g., Interface, Proposal, Reports and Documentation) that may be used by the actuary and/or the quality assurance analyst to create, debug and compile the product specification, test the product model, create product documentation, etc.

The data entered into the user interface 300 may be input to a code generator which creates computer code that becomes the product specification. FIG. 4 shows an exemplary embodiment of a screenshot of a user interface 400 for viewing and/or editing the product specification according to the present invention. On the user interface 400, the actuary, for example, may write and/or revise computer code in the product specification. In an exemplary embodiment, the product specification may have two states: a checked-in state and a checked-out state. In the checked-in state, the computer code color may be blue and the page may not be editable. In the checked-out state, the code may be multi-colored, e.g., keywords in blue, variables and functions in brown, operators and comments in green, and the code may be editable. Authority to check-in/out the product specification may be granted to, for example, an actuary, while the quality assurance analysts and others may have only have rights to access the checked-in state. In an exemplary embodiment, a versioning system may be utilized to maintain records of users checking-in/out the product specification and any changes made thereto.

Figure 5:
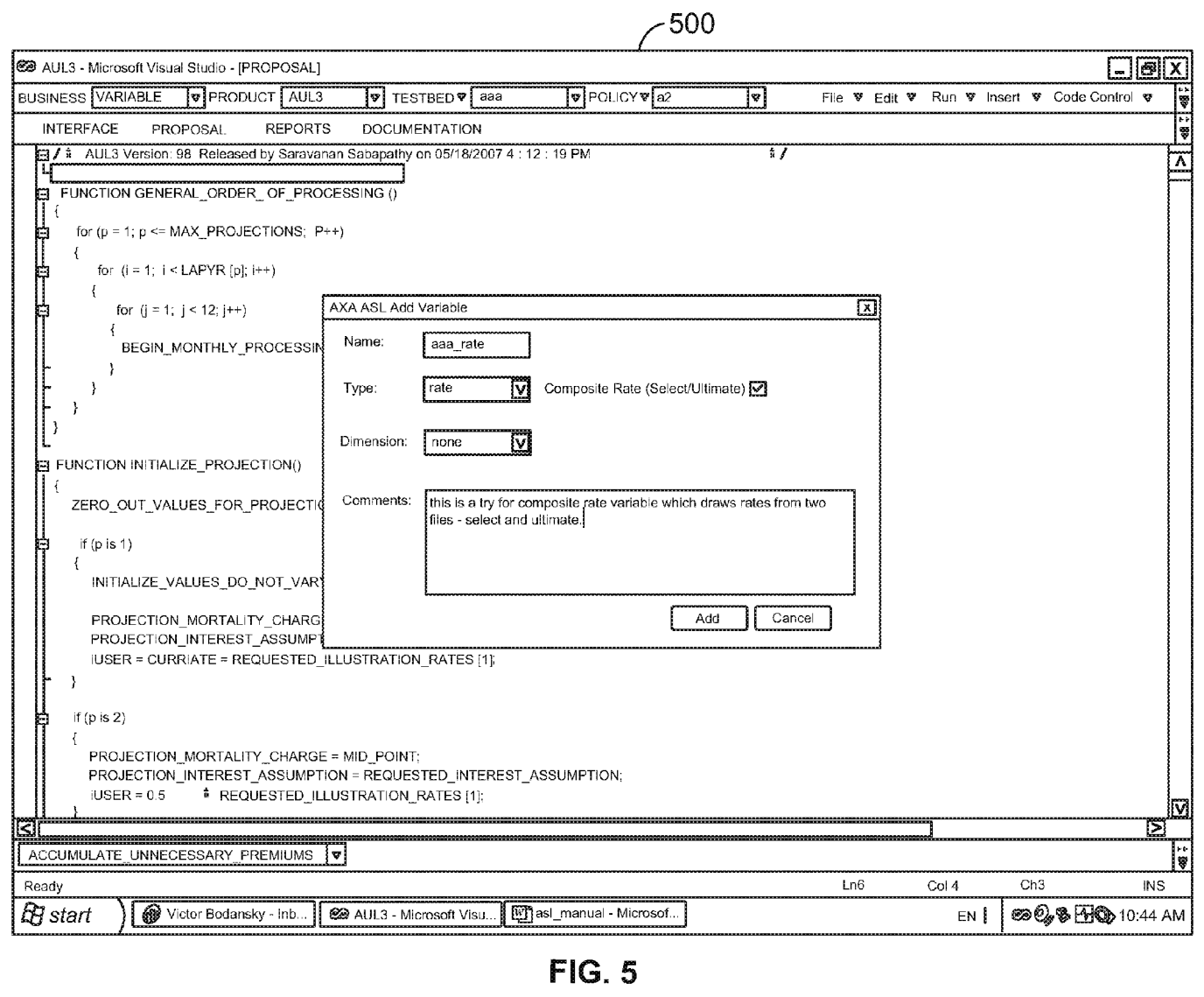
Figure 6:
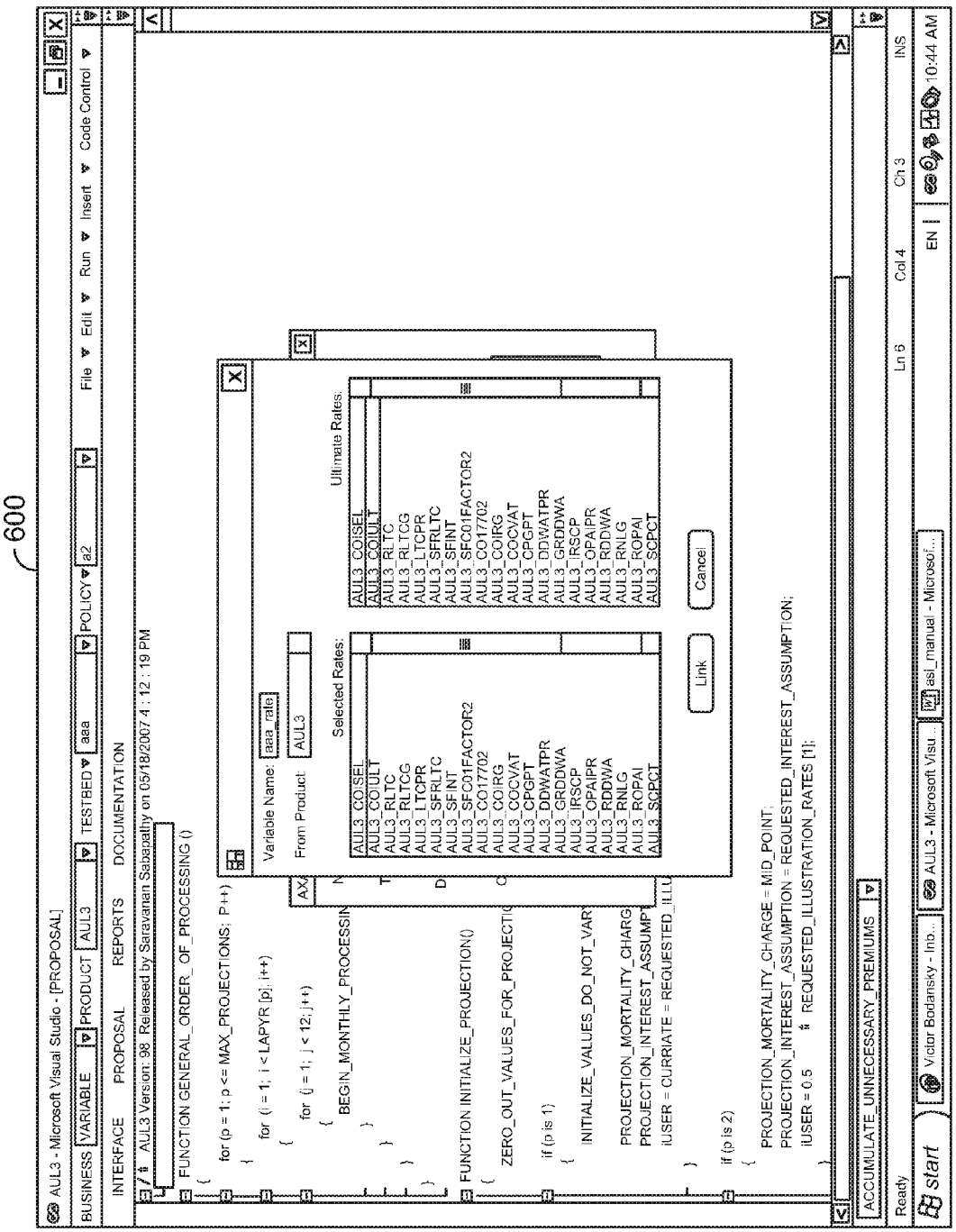
FIG. 6 shows a screenshot of user interfaces for editing a product specification according to an embodiment of the present invention.
Figure 7:
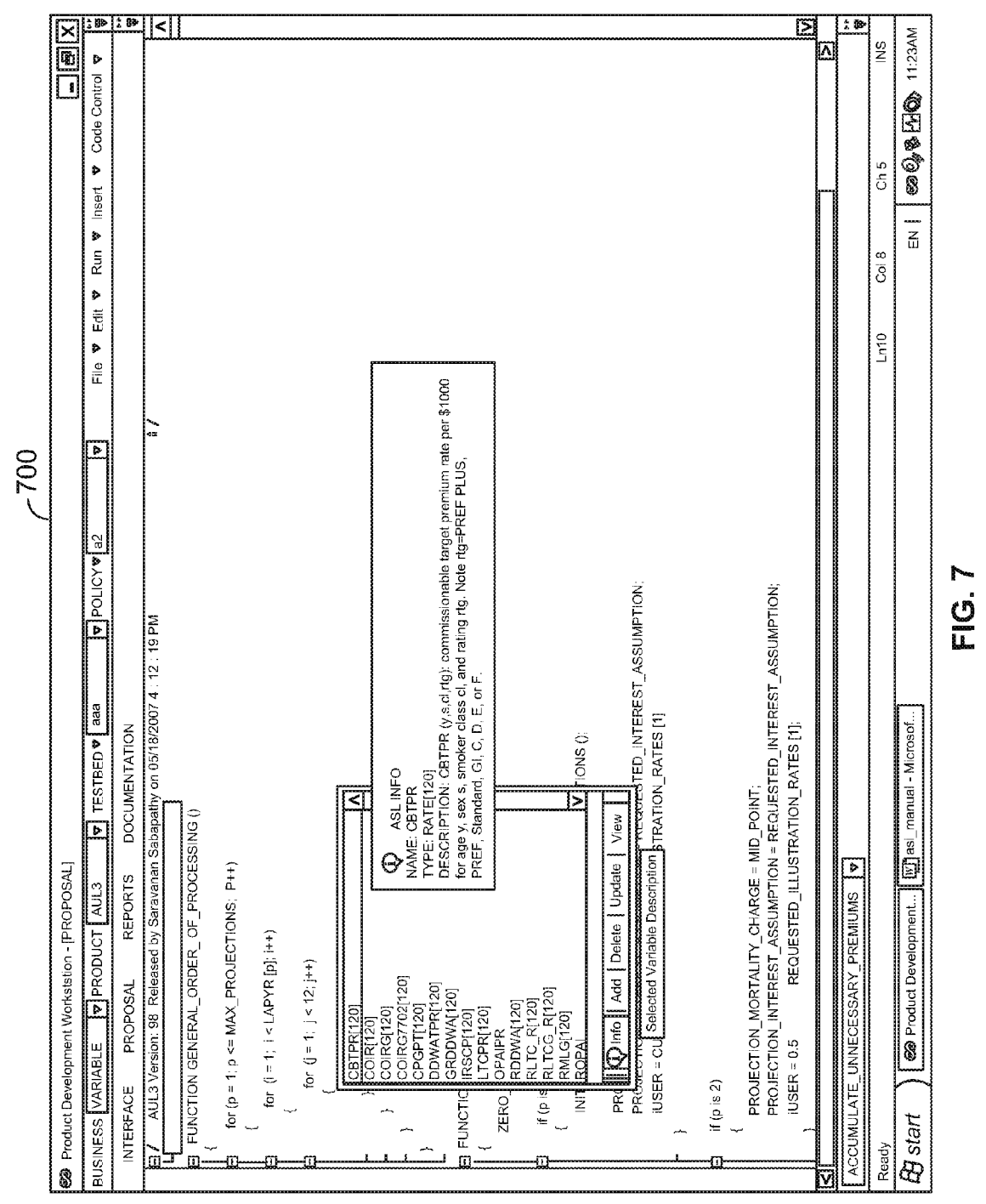

FIGS. 5-7 show exemplary embodiments of screenshots of user interfaces for editing a product specification according to the present invention. For example, FIG. 5 shows an exemplary embodiment of a user interface 500 in which a variable may be added to the product specification (and/or selected from a variable library which includes all variables used in the product specification and/or all product specifications). The variable may be named and associated with one or more selected types and/or dimensions. Also, a comment regarding the variable may be provided, to facilitate future use of the variable in other product specifications, for example. FIG. 6 shows an exemplary embodiment of a user interface 600 in which values associated with two or more variables may be linked, e.g., within the product specification and/or across multiple product specifications. FIG. 7 shows an exemplary embodiment of a user interface 700 in which variables (for the product specification or for all product specifications) may be accessed to discover more information about a given variable. The information provided for a given variable may include that which was provided in the user interface 500. As understood by those of skill in the art, permission may be granted (e.g., to actuaries) to add, remove and/or revise variables and/or their corresponding descriptions.

In step 204, a product model is created by compiling the product specification. In an exemplary embodiment, the product specification contains computer code which is written in a predetermined computer language (e.g., Actuarial Specification Language, or "ASL"). The computer language may have predetermined rules, constructs, statements, functions, variable types, variables, etc. which are accepted and which allow the product specification to be directly compiled by a compiler. That is, for example, the exemplary embodiment of the product specification shown in FIG. 4 may be entered into a compiler without any further processing, editing or reconfiguration. While or after compiling, a debugger may be utilized. While compiling (or after compiling in, e.g., report form), a product specification may be traced and a value of any variable in the production specification may be seen at any point while tracing.

Figure 8:
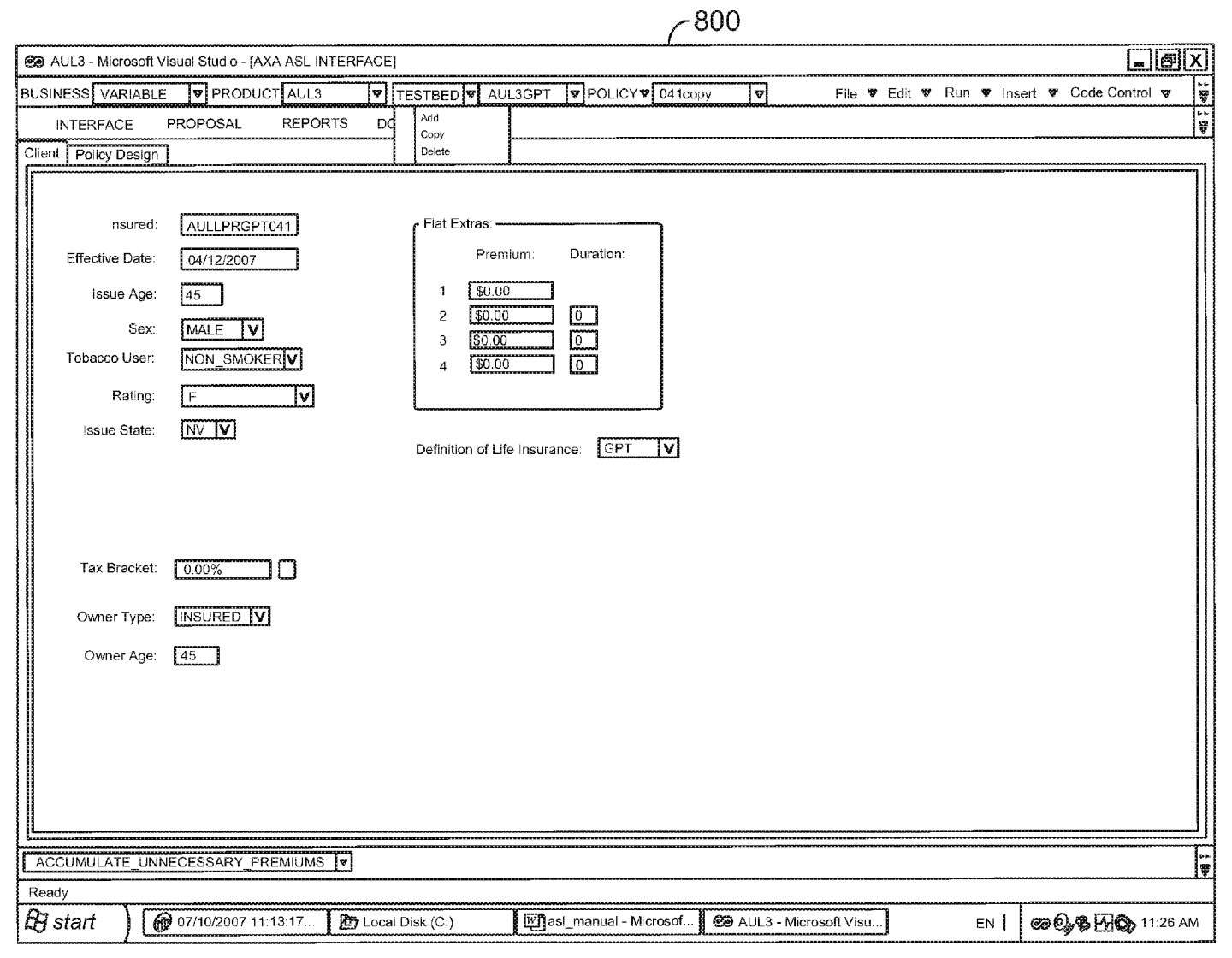

In step 206, a simulation is created (or selected from pre-existing simulations) for testing the product model. FIG. 8 shows an exemplary embodiment of a screenshot of a user interface 800 for creating and/or selecting a simulation according to the present invention. For example, a simulation may include a TestBed option which allows a user to select and/or create test data for the product model. A new TestBed may not contain any test data (e.g., test policies), whereas a previous TestBed may include any number of test policies. The user interface 800 also includes an exemplary embodiment of a form for creating a test policy, which may include, for example, a policy name, an effective date, an issue age, a gender, a medical history (e.g., smoker), a rating, an issue state, a tax bracket, an owner type, an owner age and a premium payment amount(s). By entering data in one or more of the form fields, the test policy may be created and stored for use as part of a given TestBed. Those of skill in the art will understand that the form for creating a test policy may include default values, or the user may select pre-existing test policies from a database and customize those test policies. Further, those of skill in the art will understand that any other field or data entry option may be used by the user interface 800, and, in an exemplary embodiment, selecting an option (or entering data) in a given menu/field may reconfigure (e.g., activate, gray-out, switch options, automatically populate with data) other menus/fields.

In step 208, the simulation is executed using the test data and the product model generates output data. A report may be generated (e.g., by a reporting module) during (and/or after) the simulation detailing the effect(s) of the product model on each test policy in the simulation. In step 210, the output data is compared to expected results (e.g., predetermined benchmarks). If the output data does not meet (or come within a predefined error bound) of the expected results, the product specification may be revised, as shown in step 212.

Figure 9:
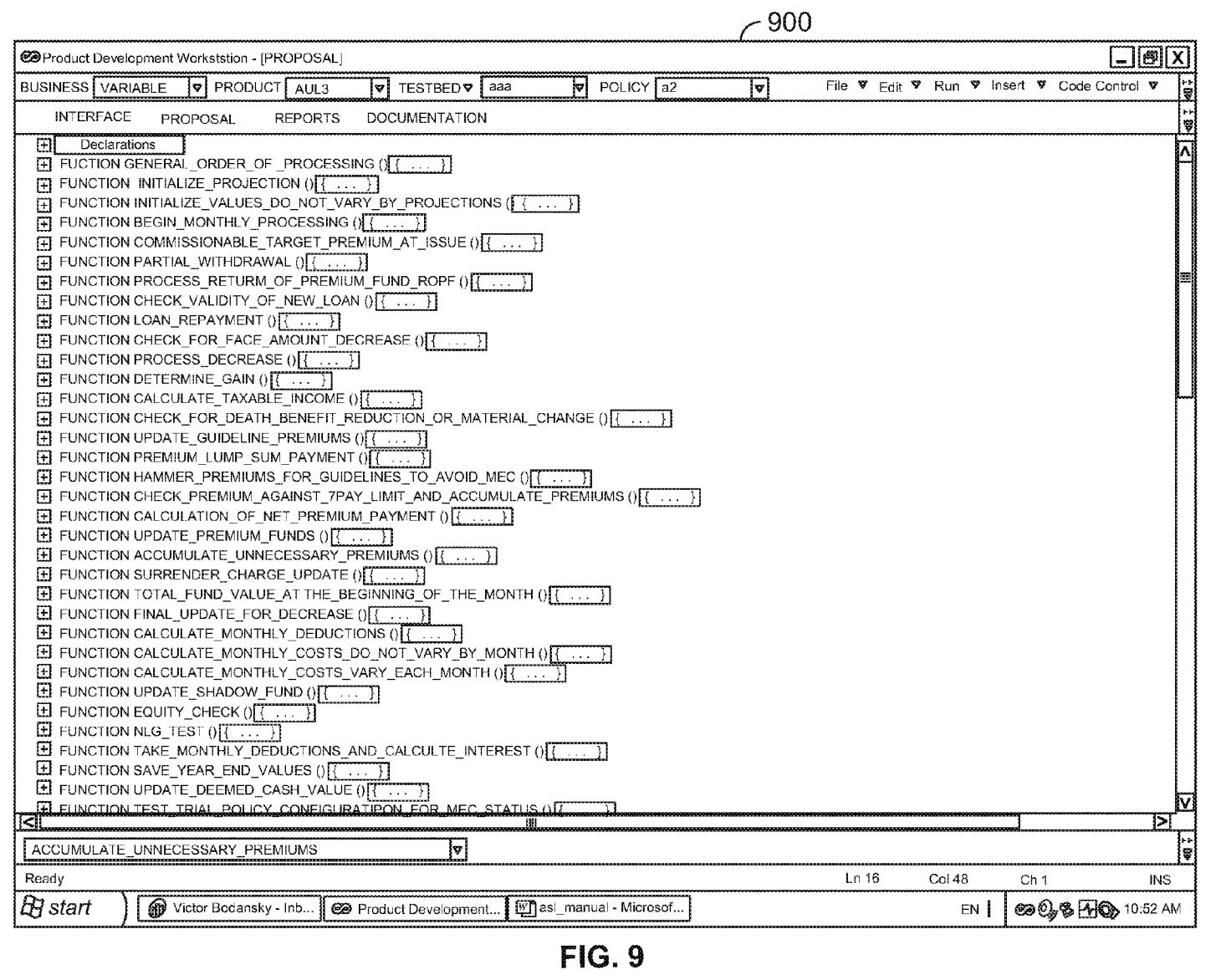

If the output data meets (or comes within the predefined error bound), product documentation may be created for the product model (step 214), e.g., by using a documentation module of a computer program. FIG. 9 shows an exemplary embodiment of a screenshot of a user interface 900 for generating product documentation for a given product according to the present invention. The documentation module may include a parsing algorithm which uses, as input, the computer code in the product specification and generates a prose description of the product. For example, the parsing algorithm may identify variables, statements, function names, etc. and use any information related thereto (e.g., descriptions of variables) to generate the product documentation. The product documentation may be output by the documentation module and editable by the quality assurance analyst using the user interface 900.

In step 216, the product and the documentation are released to an agent for sale to the public. In an exemplary embodiment, the agent may use a software program to customize and/or determine a cost associated with the product based on purchaser data (e.g., gender, age, medical history, etc.).

Those of skill in the art will understand that the screenshots shown and functions described in the figures are exemplary embodiments of the present invention, and variations on the user interface and functionality may be made without departing from the scope of the invention.

The figures are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or any other similar memory device. Computer programs (also called computer control logic or computer readable program code) are stored in a main and/or secondary memory, and executed by one or more processors (controllers, or the like) to cause the one or more processors to perform the functions of the invention as described herein.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer implemented method, comprising:
   generating a product specification for an insurance product, the product specification including computer code in a compilable format, the computer code comprising predefined statements, variables and functions;

compiling, using a computing device, the product specification computer code and generating an executable product model;

providing test data to the executable product model and generating output data;

comparing the output data to at least one predetermined benchmark and determining that the output data falls below at least one predetermined benchmark;

generating a second product specification computer code by reconfiguring a specific feature of the product specification computer code;

compiling the second product specification computer code; and generating a second executable product model.

2. The method according to claim 1, further comprising: generating a report based on the comparison of the output data and the at least one predetermined benchmark.

3. The method according to claim 2, further comprising: generating product documentation as a function of at least one of the product specification, the output data and the report.

4. The method according to claim 1, further comprising: receiving data in fields in a graphical user interface; and generating the computer code as a function of the data and the fields.

5. The method according to claim 1, further comprising: restricting access to at least one of the product specification and the product model.

6. The method according to claim 1, further comprising: identifying at least one feature of the insurance product; and selecting a previous product specification for a previous insurance product as a function of the at least one feature.

7. The method according to claim 1, further comprising: selecting the test data from a database of previous test data.

8. The method according to claim 1, wherein the compiling includes: inputting the product specification directly to a compiler.

9. A computer system, comprising a processor and memory, the memory storing instructions thereon that are executed by the processor to perform the steps of:

generating a product specification for an insurance product, the product specification including computer code in a compilable format, the computer code comprising predefined statements, variables and functions;

compiling the product specification computer code and generating an executable product model;

generating output data from data input into the executable product model; and generating a report based on a comparison of output data from a simulated operation of the insurance product and a predetermined benchmark, and, based on the report, determining that the output data falls below at least one predetermined benchmark, generating a second product specification computer code by reconfiguring a specific feature of the product specification computer code in response to determining that the output data falls below the at least one benchmark, compiling the second product specification computer code and generating a second executable product model.

10. The computer system according to claim 9, the processor performing the steps further comprising: generating documentation for the insurance product based on at least one of the product specification, the report, the output data, and the comparison of the output data to the predetermined benchmark.

11. The computer system according to claim 9, wherein the product model simulates operation of the insurance product including how it functions in various scenarios.

12. The computer system according to claim 9, the processor performing the steps further comprising: restricting access to at least one of the product specification and the report.

13. A non-transitory computer-readable medium storing a set of instructions, the set of instructions being executed by a processor, the set of instructions performing the steps of:

generating a product specification for an insurance product, the product specification including computer code in a compilable format, the computer code comprising predefined statements, variables and functions;

compiling the product specification computer code and generating an executable product model;

generating output data from test data input to the executable product model; comparing the output data to at least one predetermined benchmark and determining that the output data falls below at least one predetermined benchmark;

generating a second product specification computer code by reconfiguring a specific feature of the product specification computer code;

compiling the second product specification computer code; and generating a second executable product model.

14. The non-transitory computer-readable medium according to claim 13, wherein the set of instructions further performs the step of: generating a report based on the comparison of the output data and the at least one predetermined benchmark.

15. The non-transitory computer-readable medium according to claim 14, wherein the set of instructions further performs the step of: generating product documentation as a function of at least one of the product specification, the output data and the report.

16. The non-transitory computer-readable medium according to claim 13, wherein the set of instructions further performs the step of: receiving data in fields in a graphical user interface; and generating the computer code as a function of the data and the fields.

17. The non-transitory computer-readable medium according to claim 13, wherein the set of instructions further performs the step of: restricting access to at least one of the product specification and the product model.

18. The non-transitory computer-readable medium according to claim 13, wherein the set of instructions further performs the step of: identifying at least one feature of the insurance product; and selecting a previous product specification for a previous insurance product as a function of the at least one feature.

19. The non-transitory computer-readable medium according to claim 13, wherein the set of instructions further performs the step of: selecting the test data from a database of previous test data.

20. The non-transitory computer-readable medium according to claim 13, wherein the set of instructions further performs the step of: inputting the product specification directly to a compiler.

21. The method of claim 1, comprising:

displaying a first graphic user interface comprising a plurality of fields for entering data;

generating from the data entered into the plurality of fields the product specification computer code in a predefined computer language;

displaying a second graphic user interface comprising the product specification computer code, including the predefined statements, variables and functions; and displaying a window comprising a listing of a plurality of predefined variables usable in the product specification and information associated with respective predefined variables.

\* \* \* \* \*